United States Patent [19]
Webster

[11] 3,990,083
[45] Nov. 2, 1976

[54] DEVICE FOR RECORDING PATIENT CARE

[76] Inventor: David F. Webster, 1325A Edwards Ave., Santa Rosa, Calif. 95401

[22] Filed: Oct. 14, 1975

[21] Appl. No.: 621,851

[52] U.S. Cl. .................................... 346/41; 346/136
[51] Int. Cl.[2] ..................... G01D 9/00; G01D 15/24
[58] Field of Search ............................... 346/41, 136

[56] References Cited

UNITED STATES PATENTS

| | | | |
|---|---|---|---|
| 655,044 | 7/1900 | Auf Der Heyde | 346/41 |
| 1,315,201 | 9/1919 | Bauer | 346/41 |
| 3,235,875 | 2/1966 | Mails | 346/136 X |
| 3,787,885 | 1/1974 | Johnson | 346/136 |

*Primary Examiner*—George H. Miller, Jr.

[57] ABSTRACT

A device is provided for recording written information dealing with the care of a patient. Each additional entry advances the previous entry and records it as a permanent record on the same tape roll. Each earlier entry is thereby hidden from view, thus preventing the alteration of records.

13 Claims, 10 Drawing Figures

DEVICE FOR RECORDING PATIENT CARE

BACKGROUND OF THE INVENTION

The device of the present invention provides for the permanent recording of the various acts of patient care which are performed. The tape is of such length that a minimum of 30 days permanent recording is provided. The area in which the entry is made is covered by a slide unit which is movable between a position in which an entry can be made and a closed position in which, after an entry has been made, the entry is hidden from view. When the slide is then moved forwardly to permit an additional entry on the tape, the tape is advanced and the previous entry is moved forward out of sight. Therefore, at no time after an entry is completed can it be seen to identify the time or the type of entry previously made except by an authorized person. Thus, it is impossible for an unauthorized person to identify when the patient was last cared for. Further, no hospital employee can be aware of another staff member's entry. This prevents multiple entries to cover up any lack of regular patient inspection. Personnel will thus be protected if a patient is inspected as required by law on a regular basis by an assigned aide or nurse. Thus, the hospital and personnel will have a permanent record to present at any legal hearing should one occur.

In addition, the time of wet-bed change is immediately recorded as are patient meals. If a patient does not partake of the food served, this fact can also be noted and the time recorded. Patient body position changes will be noted as to time, thus minimizing decubitus disputes. This is of extreme importance because a position change is required every 2 hours for a patient confined to a bed. The Director of Nurses can note the time she checked on the patient so that patient accident and incidents are lessened, preventing increased insurance rates.

The device makes it impossible to leave space available for nurse's notes for a later nurse's protection. The charts would not coincide. State personnel and Director of Nurses, only, will have a key to the patient care recording unit for instant removal to verify verbal nursing comments. Nursing personnel cannot dispute poor patient care should a dispute arise as to their personnel records. In many states, citations are issued and fines levied. Also many citations must be posted on the wall of the hospital. By eliminating citations and any fines imposed prevents embarrassment to the hospital relative to patient care.

DESCRIPTION OF THE PREFERRED EMBODIMENT

Figure 1:
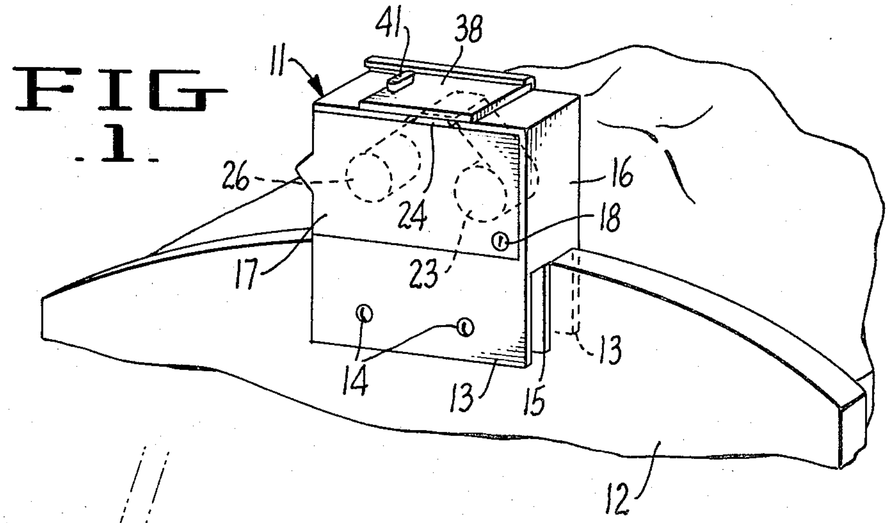
FIG. 1 is a perspective view showing the device in position on the foot board of a bed.
Figure 7:
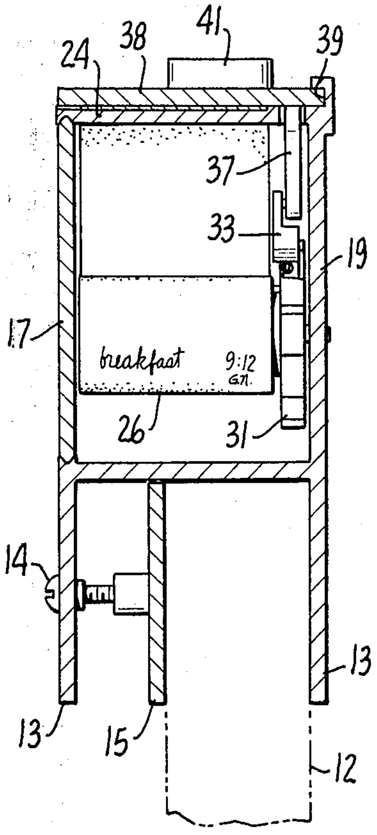
FIG. 7 is a view taken along the line 7—7 in FIG. 5.
Figure 6:
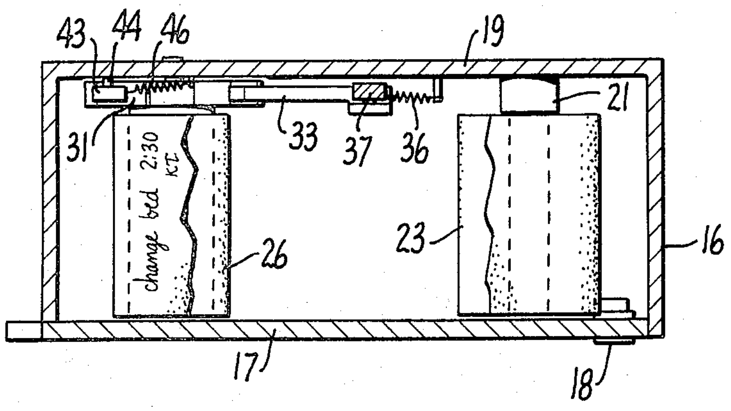
FIG. 6 is a view taken along the line 6—6 in FIG. 5.

Referring to FIG. 1, the recording device of this invention, generally indicated at 11, is mounted on a foot board 12 of a patient's bed by flanges 13 which depend from the device and fit over the foot board. The device is retained in place by screws 14 which force plate 15 into tight engagement with the foot board 12 (see FIG. 7). The device includes a receptable 16 closed by a removable door 17, the latter being adapted to be locked in a closed position by lock 18.

Mounted upon side wall 19 of the device is a fixed shaft 21 and a movable shaft 22. Shaft 21 provides a support for a roll of tape 23, the tape being fed from that roll over a support 24 and thence about a second roll 26 on shaft 22. Roll 26 has a keyway 27 thereon fitting a key 28 on roll 22.

Figure 2:
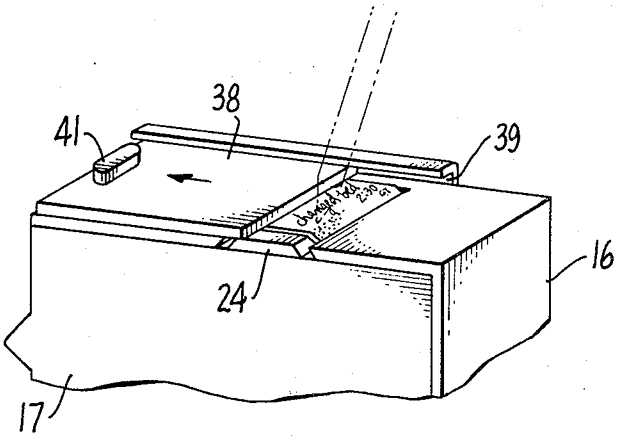
FIG. 2 is a partial perspective view showing the tape in position for recordation of a nurse's entry.
Figure 3:
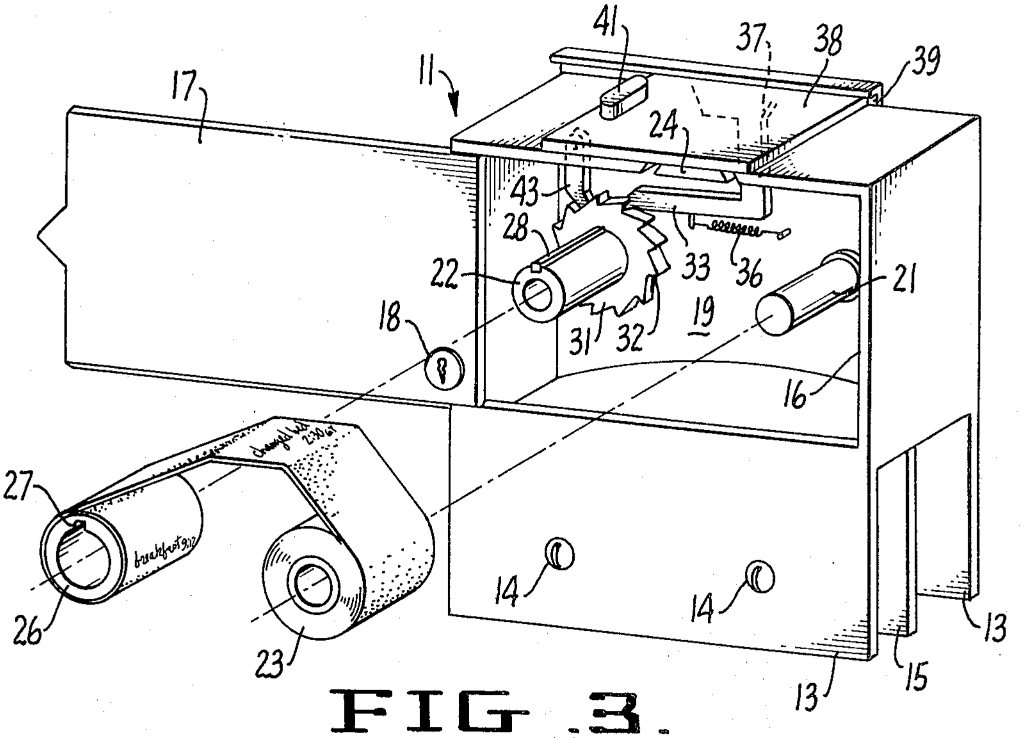
FIG. 3 is a perspective view illustrating the construction of the device and the manner of providing the tape.
Figure 4:
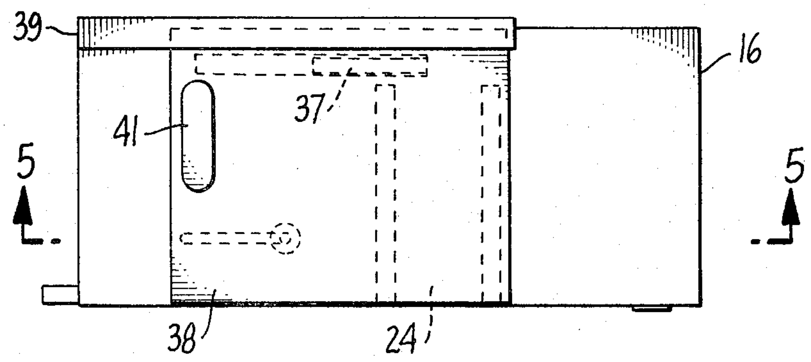
FIG. 4 is a plan view of the device.
Figure 5:
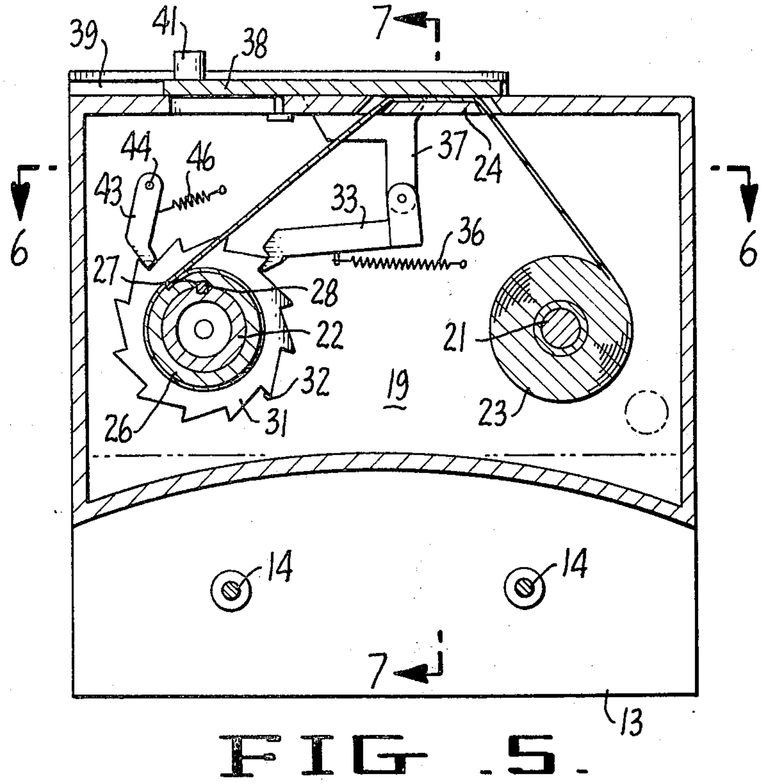
FIG. 5 is a section taken along the line 5—5 in FIG. 4.

To advance the tape from roll 23 to roll 26, I provide a ratchet wheel 31 on shaft 22, the latter having a plurality of ratchet teeth 32, the teeth being successfully engaged by a pawl 33 held against the ratchet wheel 31 by spring 36. Pawl 33 is mounted on a bracket 37 secured on the underside of the slidable top 38. Slidable top 38 is supported on the top of the device in channel 39. When the movable top 38 is pushed in the direction of the arrow in FIG. 2 by engagement with its handle 41, the tape is advanced one step to provide a fresh writing surface upon which an entry can be made by a nurse or other authorized personnel. It is impossible to back up the tape because of the engagement of the ratchet wheel 31 with a dog 43 hinged as at 44 on the side wall 19 under the pressure of a spring 46.

When the movable top 38 is returned to a position in which the entry on the tape is concealed, the tape remains in this position until the movable top 38 is again advanced to open position to expose a length of tape so that a fresh entry can be made. Previous entries are wound up upon the roll 26 and thus cannot be viewed by one not having means to operate the lock 18.

Figure 8:
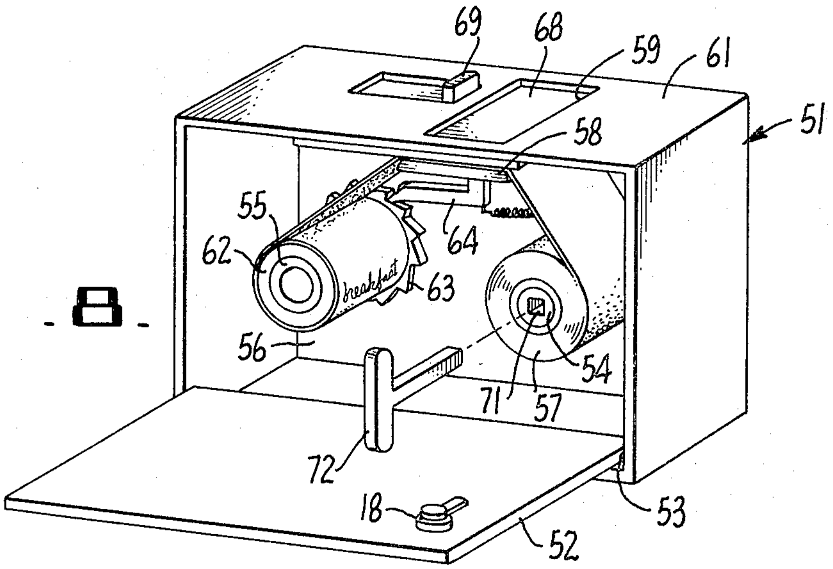
FIG. 8 is a perspective view of a modified form of the device.
Figure 9:
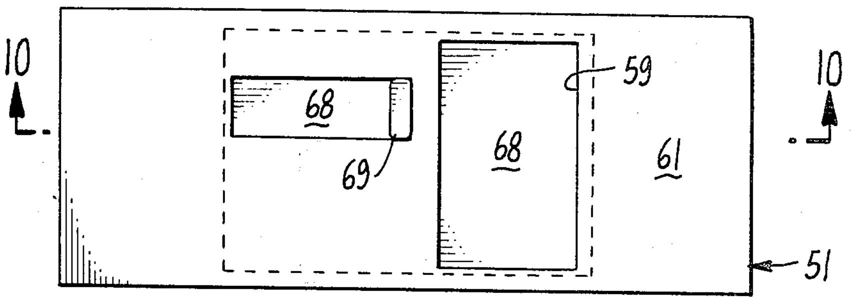
FIG. 9 is a plan view of the device shown in perspective in FIG. 8.
Figure 10:
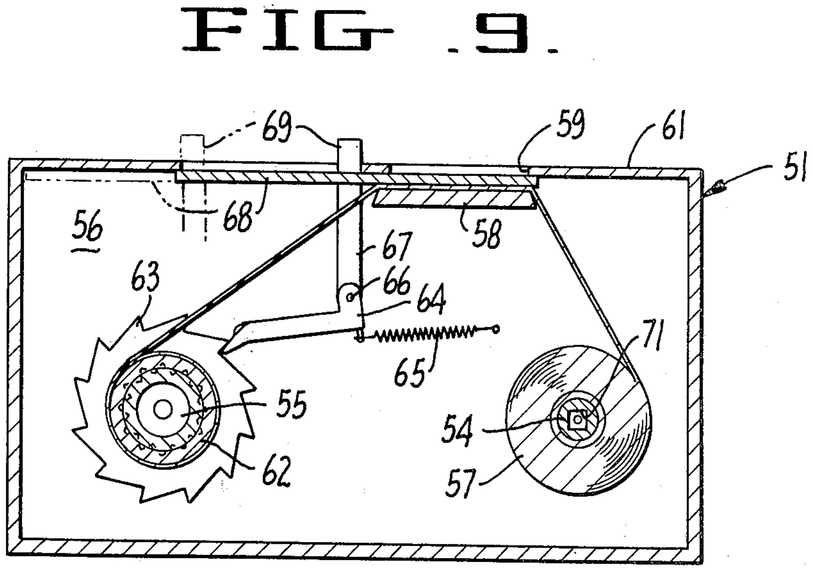
FIG. 10 is a section taken along line 10—10 in FIG. 9.

In that form of the device shown in FIGS. 8, 9 and 10, the recording device is generally indicated at 51. This includes a door 52 hinged as at 53 along the bottom edge of the device. Shafts 54 and 55 are mounted in spaced relation upon vertical side wall 56. A roll of tape 57 is mounted upon shaft 54 and tape from this roll passes upwardly over a writing shelf 58 mounted beneath an opening 59 in the top 61 of the device. The tape extends to a spool 62 mounted upon shaft 55 which spool is in driving engagement with the shaft 55. Mounted upon shaft 55 is a ratchet wheel 63 which is effective to rotate shaft 55. Rotation of the shaft 55 is effected by means of a pawl 64 which is selectively engaged with ratchet wheel 63 under the tension applied by spring 65. The pawl is made in the form of a bell crank, one end of which is hinged as at 66 on a lever 67 which is fixed on the underside of slidable top 68. The slidable top has handle 69 and is movable therewith between a closed position, as appears in FIGS. 8, 9 and 10, and the forward position in which slidable top is advanced to expose that portion of the tape supported on the shelf 58 immediately below opening 59 in top 61.

When it is desired to make an entry on the tape, the lever 67 is advanced from the full line position in which it appears in FIGS. 8, 9 and 10 to the dotted line position shown in FIG. 10. Movement of the top by the lever 67 is effective to rotate the ratchet and so advance the tape, thus withdrawing the previous entry from view and winding the tape up on spool 62. When the entry has been completed, the arm 67 is moved to the right in FIG. 10 which serves to retract the pawl to its starting position in which it can again advance the ratchet wheel.

If it is desired to remove the tape from the device for examination, this can be achieved quite readily by opening the lock 18 and lowering the door 52. Shaft 54 is formed with a square recess 71 in which one can insert the end of key 72 to permit rotation of shaft 54 and return of the tape from spool 62 during the rotation of shaft 54. It is, of course, necessary for one to move the pawl 64 from engagement with the ratchet wheel 63 so that the latter may be rotated in a clockwise direction.

The unit is not necessarily limited to bed attachment but may also be used in any area associated with a patient's care and requiring verification of either time or events pertinent for future reference.

I claim:

1. In a recording device having a receptacle which includes a side wall, a side door, end walls, a top wall and a bottom wall, a pair of spaced shafts mounted on said side wall, the top of the receptacle having a slidable door mounted thereon to be movable between a closed and an open position in which open position a first section of a roll of tape is exposed for recording a written message by a user, the tape extending between the two shafts and over a support for the tape, a first one of said shafts having rotating means thereon for rotating said first shaft to advance the tape over the support from the second shaft to the first shaft, engaging means connected to said slidable door and engaged with said rotating means in a manner such that said first shaft is selectively rotated upon movement of the slidable door from its closed to its open position to move the first tape section out of the exposed position and into a location whereat it is accessible only to authorized persons and whereat said first section is hidden from view and a new section of tape is exposed for recording a message by the user.

2. A recording device as in claim 1 wherein said slidable door includes a handle thereon.

3. A recording device as in claim 1 wherein said slidable door is mounted inside said receptacle and includes means extending through said top wall for moving said slidable door.

4. A recording device as in claim 1 wherein said engaging means is in the form of a bell crank connected to a lever which is mounted on said slidable door.

5. A recording device as in claim 1 further including means on said side wall for yieldably biasing said engaging means into engagement with said rotating means.

6. A recording device as in claim 1 further including means on the receptacle for mounting the receptacle on a bed.

7. A recording device as in claim 1 wherein the side door is slidably connected to said bottom and top walls and includes locking means for locking said side door to the walls of said receptacle.

8. A recording device as in claim 7 wherein said roll of tape is removably mounted on said shafts to be removable from said receptacle.

9. A recording device as in claim 1 wherein the side door is hingeably connected to said bottom wall and includes locking means for locking said side door to the walls of said receptacle.

10. A recording device as in claim 9 wherein said second shaft includes a rewind means for rewinding said tape from said first shaft onto said second shaft after said side door has been opened.

11. A recording device as in claim 1 wherein said rotating means includes a ratchet mounted on the first shaft and said engaging means move the ratchet selectively to advance the tape upon return of the slidable door to its open position.

12. A recording device as in claim 2 wherein a dog is provided in engagement with the ratchet permitting rotation of the ratchet in only one direction upon opening movement of the slidable door.

13. A recording device as in claim 12 further including means on said side wall for yieldably biasing said dog into engagement with said ratchet.

* * * * *